Jan. 19, 1954 J. MacDONELL 2,666,650

SOUND PICKUP AND REPRODUCING APPARATUS

Filed Feb. 7, 1951

2 Sheets-Sheet 1

Inventor
John MacDonell

By
Lancaster, Allwine & Rommel
Attorneys

Jan. 19, 1954 J. MacDONELL 2,666,650

SOUND PICKUP AND REPRODUCING APPARATUS

Filed Feb. 7, 1951 2 Sheets-Sheet 2

Inventor

John MacDonell

By Lancaster, Allen & Rommel

Attorneys

Patented Jan. 19, 1954

2,666,650

UNITED STATES PATENT OFFICE 2,666,650

SOUND PICKUP AND REPRODUCING APPARATUS

John MacDonell, Redwood City, Calif.

Application February 7, 1951, Serial No. 209,724

1 Claim. (Cl. 274—27)

This invention relates to apparatus for use in reproduction and recording of sound and more particularly to a sound pickup with photoelectric means enabling the reproduction of sound with an extremely high degree of naturalness.

In the following description and accompanying drawings, I shall describe and show highly satisfactory forms of my invention, and specifically set forth certain of its more important objects. I do not limit myself to the forms disclosed, since various changes and adaptations may be made therein without departing from the essence of my invention as hereinafter claimed, and the objects and advantages will be readily apparent to those skilled in the art as falling within the scope of my invention.

My invention relates to photoelectric means for reproducing, amplifying and recording sound and in general its object is to improve the quality of sound reproduction to such a degree as to render it difficult to distinguish recorded or amplified sound from original sound, and to eliminate microphones, booms, cables, and all such paraphernalia as is currently required.

It is also an object of my invention to provide such apparatus which will make it unnecessary for a speaker or artist to be held to a critical spot before a microphone and permits speakers or artists to move freely about a stage or rostrum, and be heard as well at a distance as at close range.

More specifically, my principal objects are; first, to provide sound reproducing and/or amplifying means adapted to respond to exceedingly small variations in sound; second, to furnish facilities for obtaining the full effect of overtones in the reproduction and/or amplification and/or recording so as to be indistinguishable from the original; third, to obviate the effect of stray noises in the reproduction, amplification or recording due to mechanical vibrations; fourth, to provide sound reproducing and/or amplifying equipment which is so constructed and may be so arranged with respect to the zone where a performance is being carried on, as to eliminate the necessity for the usual microphones, cables, booms, etc. exposed to view, and thereby permit absolute freedom of a speaker or performer to move about in the zone such as on a stage. By use of this invention a stage play may be as clearly audible to the audience in the gallery as to those in the first row; fifth, to secure the above results by means of apparatus of great simplicity and relatively low cost and; sixth, this device may be used to photograph sound directly on film.

With the foregoing objects and advantages in view details of highly satisfactory forms of my invention will appear in the following description supplemented by the accompanying drawings forming a part of this specification.

Figure 1:
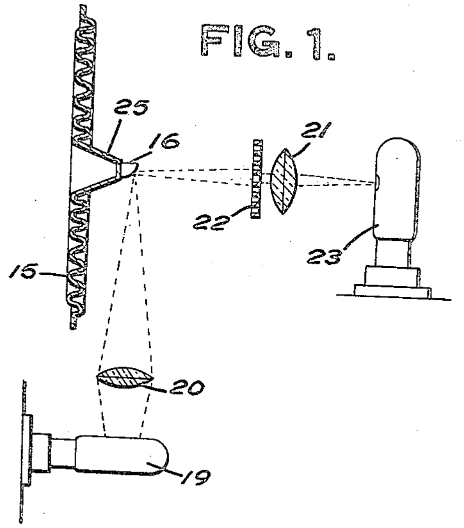
Fig. 1 is a diagrammatic detail view of one form of my invention illustrating the operating principles thereof.

In general the sound reproducing apparatus includes a sound pickup comprising a diaphragm 15 carrying a mirror 16 or 17 or a grid 18, an exciter lamp 19, and condensing lenses 20 and 21 and a grid 22 in the path of light from lamp 19 to a photoelectric cell 23 which may be connected with a conventional type of amplifier and sound reproducing speakers, or to film 24 in a sound recording apparatus. The invention contemplates numerous improvements in such arrangements, diaphragm constructions, sound control, sound pickup arrangements and other features as will be described herein in detail.

Figure 2:
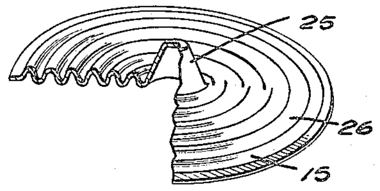
Fig. 2 is a fragmentary perspective view of the preferred form sound pickup diaphragm used in connection therewith.

Referring first to Fig. 2, which illustrates the diaphragm 15 in detail it will be noted that its shape and construction establish it a highly essential and critical component in the invention. The principle of its action is that its central cup element 25, or cup-like shell projection which is in the form of a cone has transmitted to it the resultant of all the sound waves of different frequencies impinging on the rest of the corrugated surface 26 of the diaphragm. Due to the central position of the cup or cone the mutual interference effect of nodes developing on the diaphragm area is obviated, as is also the detrimental effect of variations in the physical properties of adjacent areas of the substance of the diaphragm. In addition, the cold-working developed in the forming process imparts characteristics of toughness and resilience that permit the most desirable response to the multiplicity of sound waves impinging on it. Due to its function as well as non-resonating quality this cup-like shell could be termed a "Focalizer" as it does focus sound, and concentrate it to the frustum of the cone. The term "Focalizer" bears no implication of resonant attributes. The "Focalizer" is an integral part of the resonant diaphragm, and collects all vibrations impinging on the diaphragm, resolving them into the resultant vibration complex.

The conventional diaphragm without such cup or cone element has at its center a portion which is inert, in that the ratio of its thickness to its diameter approaches equality, thus rendering it completely unresponsive to sound vibrations. This inert center inhibits the fluent action of the rest of the diaphragm by the very fact of the center of the diaphragm approaching infinity dimensionally, thus providing a non-resonating bridge to permit cross interference from opposite parts of the diaphragm, and the establishment of adventitious nodes. In the diaphragm in accordance with my invention only the corrugated portion is responsive to sound, and the cup or cone is placed immediately adjacent, and in a position to be immediately responsive to this sensitive corrugated portion.

In a highly satisfactory construction of this diaphragm the diaphragm is two inches, in diameter, having a cup element in the form of forty-five degree cone five eighths of an inch diameter at the base, $\frac{3}{32}''$ high with a frustrum one eighth of an inch in diameter. It is of aluminum foil, fifteen ten thousandths of an inch thick, with five corrugations one eighth of an inch from crest to crest, and three thirty-seconds of an inch from crest to trough. These dimensions of course may be varied as well as other materials with other vibratory responses which would require other dimensions and a different number and type of corrugations may be employed. However in order that the diaphragm should function best in the manner described, the diaphragm is circular in shape and integrally formed with a continuous series of concentric corrugations of uniform size extending radially outward between parallel planes from the central cup-like projection to adjacent the peripheral edge thereof. This arrangement provides for a maximum uniform corrugated surface 26 of the diaphragm which with the cone or central cup element constitutes one of the dominant features of my invention.

The forty-five degree cone appears to be the optimum in the matter of vibration at right angles to the plane of the diaphragm as a matter of observation under a strobolamp.

The diaphragm may be made with a central projection cup of any shape, as a cylindrical cone, a hemisphere, a pyramid, a cylinder, etc., though as mentioned before, a truncated cone has been found to be the most satisfactory from both a production and a functional standpoint.

For recording, reproducing and/or amplifying sound I show in the drawings three methods of utilization of my diaphragm, each of which develops characteristics of operation basically similar, but yet with minute variations which render one more adaptable to certain conditions than another. These conditions are such as differentiate a permanent studio type of installation from a portable one, or under extremes of temperature, humidity or vibration.

In Fig. 1 the diaphragm 15 has fixed to the frustrum of its cup or cone 25 a segment of a cylindrical 1st surface mirror 16. Light from the exciter lamp 19 is condensed and focussed by the lens 20 upon the cylindrical mirror 16, whence it is refracted to the grid 22, where modulation occurs, thence to the condensing and focussing lens 21, which concentrates the modulated beam upon the sensitive area of the photoelectric cell 23, from which connections are made to conventional means of amplification, recording or reproduction apparatus as is well known to those familiar with sound reproduction, motion pictures, and allied arts. Of course means are provided for proper adjustments of all the elements of the system, lamp, lenses, grid, diaphragm, photoelectric cell, etc., to ensure exact and harmonious relationship of all components.

The use of a cylindrical mirror 16 as a secondary light source for the purpose of direct photography of sound on films, or the reproduction, amplification or recording of sound, is to obtain a greatly attenuated reflection, in the axis of the mirror, of the beam of light from the high intensity lamp. The attenuation increases with a reduction in the radius of the cylindrical mirror and provides an extremely thin band of light of great intrinsic brilliance.

Due to the curvature of the mirror 16 the light from the condenser lens 20 is refracted at an angle to the grid 22. This angle increases or decreases with the oscillations of the diaphragm under the influence of sound waves impinging on its responsive area, and causes the modulation of the reflected beam, and due to the curvature of the mirror the angle of swing of the beam is greatly increased by lateral movements thereof due to sound vibrations impinging on the diaphragm.

The grid 22 is a flat piece of translucent material, such as glass, quartz, plastic, etc., ruled or divided in parallel lines, equally distant, equally wide, whose translucence is regulated in accordance with the characteristics of the exciter lamp and photo-cell. Each alternate space of the grid is opaque, and the intervening clear spaces are left more or less light transmissive as is required, usually by the type of photoelectric cell used.

Figure 3:
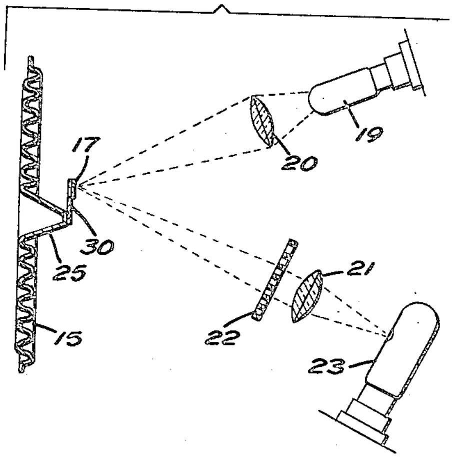
Fig. 3 is a diagrammatic detail view similar to Fig. 1 with slight modifications.
Figure 4:
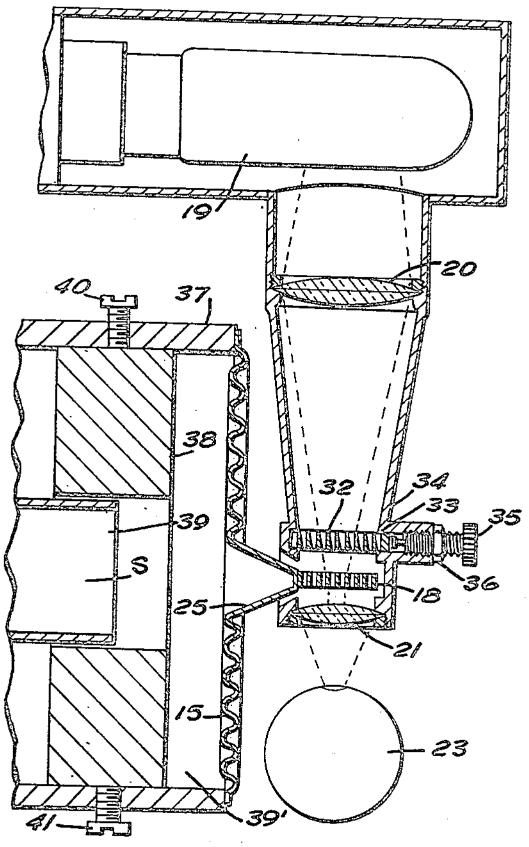
Fig. 4 is a transverse sectional view of a form of my invention illustrating a further modification.
Figure 5:
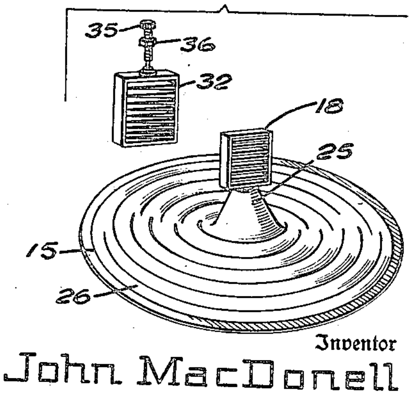
Fig. 5 is a detail perspective view illustrating details of parts shown in Fig. 4.
Figure 6:
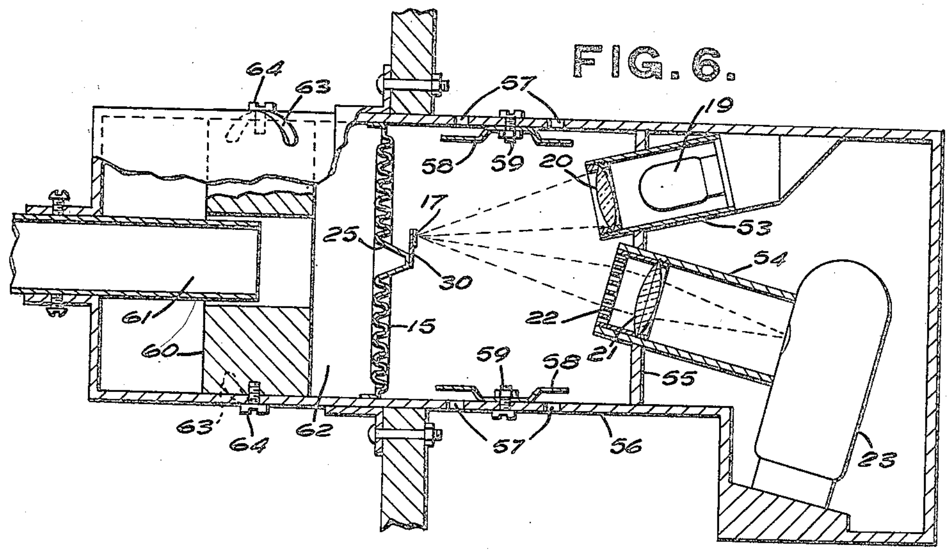
Fig. 6 is a transverse sectional view of a construction similar to Fig. 3 and illustrating further details and parts being shown diagrammatically.

In Fig. 3 the arrangement is substantially the same as that shown in Fig. 1 except in place of the cylindrical mirror 16 a small plane or flat surface mirror 17 affixed to the truncation of the cone 25 and at the end of a Celluloid lever 30 which is primary means of support. This Celluloid lever 30 is of such dimensions as will provide a desirable and harmonious adaptation to the frequency response characteristics of the diaphragm, and be possessed of sufficient resilience to submit to the flexing caused by its own inertia during vibration of the diaphragm.

In a highly satisfactory construction of the pickup this lever 30 is made of white Celluloid of the following dimensions: length, eleven thirty-seconds of an inch; width, eighty-five thousandths of an inch and thickness, seventeen thousandths of an inch. On it is mounted a first surface mirror twelve thousandths of an inch thick by ninety-five thousandths of an inch square attached to the lever by an acetate glue, the lever in turn being attached to the frustrum of the cone with the same glue. The mirror is side while the pickup is in the opposite wall. Such a parabolic reflector may be any size, determined by the acoustical requirements, and may be a ceiling installation or on opposite walls of a stage, or incorporated into the architectural or decorative scheme of a hall. Assuming a parabolic reflector of twenty feet focal length, it could be placed out of sight. Any sound vibrations from any source would be concentrated at the focal point of the reflector (which is the location of the diaphragm) the same as the human ear, and this reflector may be directional or omni-directional as desired.

Figure 8:
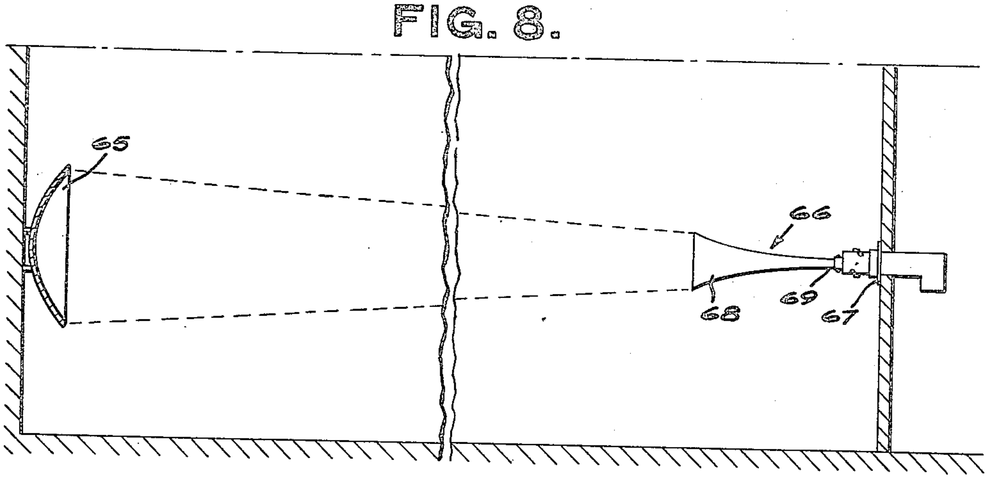
Fig. 8 is an elevation view illustrating an application in which the apparatus may be employed and showing a satisfactory form of mounting for the pickup.
Figure 7:
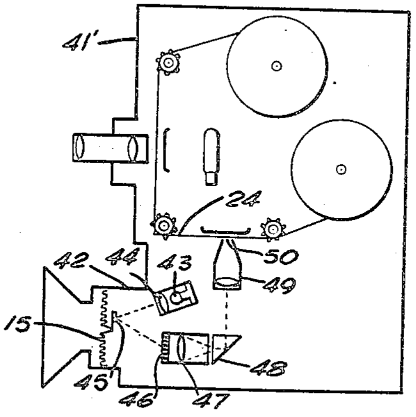
Fig. 7 is a diagrammatic illustration of a sound reproduction apparatus in conjunction with a recording element in the form of a film in a motion picture camera.

In this Fig. 8 one of numerous methods of mounting the pickup is shown. Of course hanging supports, wall brackets or stand supports may be employed for the pickup but, as shown the pickup 66 is shown mounted in a flange plate 67 so as to project therefrom with its sound collecting element in the form of horn 68 extending from the stationary throat portion 69 of the device. This flange arrangement also provides a satisfactory ceiling mounting means for the pickup.

In the various arrangements it will be noted that the exciter lamp and photo cell are in close proximity to the diaphragm and mirror in order to maintain optical elements in sharp focus and minimize light losses due to dispersion and absorption.

There are four wires leading to the pickup unit, two to the photo cell and two to the exciter lamp, but these are all off stage and out of sight of the audience.

The sensitivity and fidelity of the systems based on my diaphragm is comparable only to natural hearing, and provides essentially the same results of diminished volume with distance, reflection from wall surfaces, ability to pick up sound at any distance that the human ear does and complete freedom from mechanical distortion.

Summing up several of the important features of my pickup as above described it will be pointed out the equipment responds to exceedingly small vibrations because there is no mechanical or magnetic loading of the diaphragm. Therefore, its response to the effect of small vibrations is completely unrestricted by any factor other than the internal molecular stresses developed in its own extremely thin section.

The obtaining of the full effect of overtones is due to the essential difference in the design of the diaphragm as compared with all others, i. e., the use of the cup-like shell projection of the diaphragm. It acts to eliminate mutual interference in the resonating areas of the diaphragm under the effect of all vibrations, fundamental and harmonic, being transmitted to the cup-like shell projection, but also being prevented from affecting any portions of the diaphragm again after acting thus. This is because the cup-like projection is non-resonant, and responds as a unit to the vibrations of the resonant portion of the diaphragm, transmitting the resultant of all the vibrations, as does the human ear.

This equipment can develop no mechanical vibrations because of its design. Nothing is actuated secondarily and directly by the vibrations of the diaphragm which is therefore free to flex without restraint. There are no joints, no linkages, no connections with anything to cause stray noises. The diaphragm merely serves to modulate a beam of light, so if the diaphragm itself were made of a substance that was inherently noisy, as crystalline tin, the noise could not travel along as non-material a substance as a beam of light to affect the photoelectric cell in any way, and thus reach the amplifier and speakers.

I claim:

In sound reproducing apparatus, a pickup including, a circular diaphragm having concentric corrugations surrounding a central integral cup portion extending inwardly of the diaphragm and carrying a deflecting element for transmitting vibrations imparted by the effects of sound on the corrugated area of the diaphragm to a sound reproducing or recording system, and a casing in which said diaphragm is mounted with sound translating elements of the reproducing or recording system housed therein, the portion of the casing forward of the diaphragm being formed to provide a cylindrical sound chamber concentric with the diaphragm with a forward sound receiving opening also concentric thereof, a cylindrical bushing slidably mounted in said sound chamber in front of the diaphragm, said bushing having a sound opening concentric thereof and in alignment with said sound receiving opening, and means for moving said bushing forwardly and rearwardly with respect to the diaphragm for varying the effective volume of the sound chamber in front of the diaphragm.

JOHN MacDONELL.

References Cited in the file of this patent

UNITED STATES PATENTS

| Number | Name | Date |
|---|---|---|
| 1,203,190 | Fritts | Oct. 31, 1916 |
| 1,607,480 | Ries | Nov. 16, 1926 |
| 1,732,722 | Horn | Oct. 22, 1929 |
| 1,744,032 | Baldwin | Jan. 21, 1930 |
| 1,812,687 | De Forest | June 30, 1931 |
| 1,881,146 | Sugar | Oct. 4, 1932 |
| 1,897,222 | Weinberger | Feb. 14, 1933 |
| 1,899,994 | Spotts | Mar. 7, 1933 |
| 1,918,422 | Nystrom | July 18, 1933 |
| 2,039,104 | Morris | Apr. 28, 1936 |
| 2,085,194 | Kellogg | June 29, 1937 |
| 2,173,994 | Anderson | Sept. 26, 1939 |
| 2,249,606 | Friebus | July 15, 1941 |
| 2,259,511 | Banks | Oct. 21, 1941 |
| 2,354,295 | Albin | July 25, 1944 |

FOREIGN PATENTS

| Number | Country | Date |
|---|---|---|
| 149,206 | Great Britain | Nov. 14, 1921 |